US008823835B2

(12) United States Patent
Machida

(10) Patent No.: US 8,823,835 B2
(45) Date of Patent: Sep. 2, 2014

(54) IMAGE PROCESSING APPARATUS, RADIATION IMAGING SYSTEM, IMAGE PROCESSING METHOD, AND STORAGE MEDIUM STORING A PROGRAM

(75) Inventor: Yoshihito Machida, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 13/175,280

(22) Filed: Jul. 1, 2011

(65) Prior Publication Data
US 2012/0002083 A1    Jan. 5, 2012

(30) Foreign Application Priority Data

Jul. 5, 2010 (JP) ................................. 2010-153224

(51) Int. Cl.
*H04N 5/262* (2006.01)
*G06T 3/40* (2006.01)
*G06T 5/40* (2006.01)
*G06T 5/00* (2006.01)

(52) U.S. Cl.
CPC ..... G06T 3/4038 (2013.01); *G06T 2207/20212* (2013.01); *G06T 2200/32* (2013.01); G06T 5/40 (2013.01); G06T 5/009 (2013.01); *G06T 2207/10116* (2013.01)
USPC ....................................... 348/239; 348/222.1

(58) Field of Classification Search
USPC .............................................. 348/239, 222.1
See application file for complete search history.

(56) References Cited

U.S. PATENT DOCUMENTS

| 6,563,943 | B1 | 5/2003 | Sasada |
| 7,167,581 | B2 | 1/2007 | Kawano |
| 7,440,559 | B2 | 10/2008 | Muhonen et al. |
| 7,440,599 | B2 | 10/2008 | Kato |
| 2004/0114717 | A1* | 6/2004 | Kato ............................... 378/62 |
| 2005/0069187 | A1* | 3/2005 | Kaji ............................... 382/128 |
| 2005/0213849 | A1 | 9/2005 | Kreang-Arekul et al. |
| 2006/0110064 | A1 | 5/2006 | Battle et al. |
| 2006/0177150 | A1 | 8/2006 | Uyttendaele et al. |

FOREIGN PATENT DOCUMENTS

| CN | 1457024 A | 11/2003 |
| CN | 1764243 A | 4/2006 |
| CN | 1847977 A | 10/2006 |
| CN | 1849627 A | 10/2006 |
| CN | 101365039 A | 2/2009 |
| EP | 929051 A2 | 7/1999 |
| EP | 2012271 A2 | 1/2009 |
| JP | 04-270474 A | 9/1992 |
| JP | 11-122469 A | 4/1999 |
| JP | 2000-339444 A | 12/2000 |
| JP | 2000-342566 A | 12/2000 |
| JP | 2000-342567 A | 12/2000 |
| JP | 2001-274974 A | 10/2001 |
| JP | 2001-351092 A | 12/2001 |
| JP | 2004-057506 A | 2/2004 |
| JP | 2005-296332 A | 10/2005 |
| JP | 2006-181149 A | 7/2006 |

* cited by examiner

Primary Examiner — Antoinette Spinks
(74) Attorney, Agent, or Firm — Canon USA Inc. IP Division

(57) ABSTRACT

An image processing apparatus includes an image acquisition unit configured to acquire a plurality of partial images obtained by shooting each of a plurality of shooting ranges which a shooting region of an object are divided into, a feature amount acquisition unit configured to acquire a feature amount of at least one of the partial images, a characteristic acquisition unit configured to acquire a gradation conversion processing characteristic based on the feature amount and the shooting region, and a conversion unit configured to convert, based on the processing characteristic, a gradation of an image of the shooting region of the object obtained by joining the partial images.

21 Claims, 7 Drawing Sheets

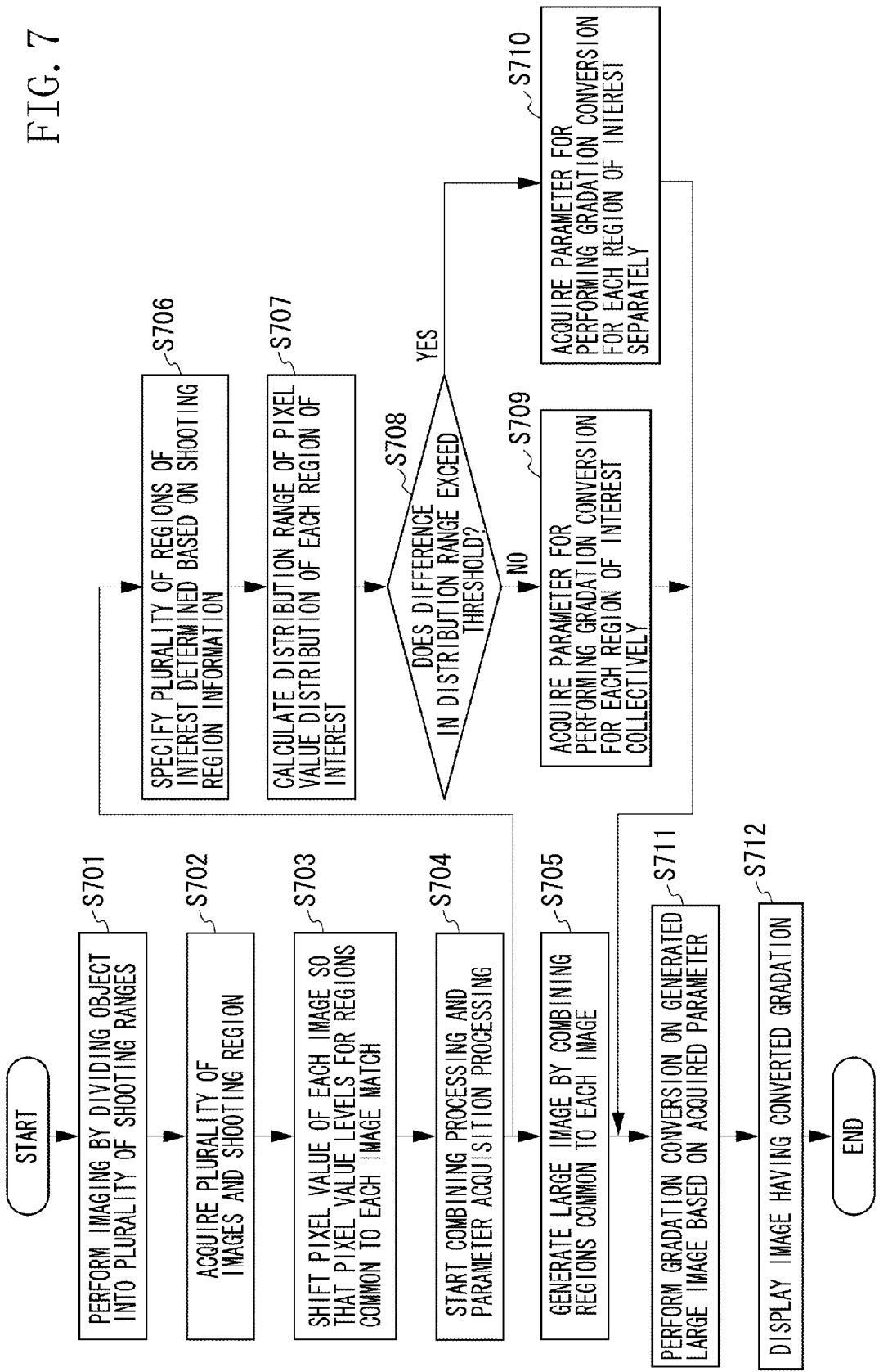

IMAGE PROCESSING APPARATUS, RADIATION IMAGING SYSTEM, IMAGE PROCESSING METHOD, AND STORAGE MEDIUM STORING A PROGRAM

BACKGROUND OF THE INVENTION

1. Field of the Invention

The present invention relates to gradation conversion of an image.

2. Description of the Related Art

Gradation conversion is a process in which a pixel value band in an image is highlighted as compared with the other bands. Gradation conversion is used to match the gradation of an image with the gradation during recording and the gradation of a display device, and to increase the gradation of a region of interest. This processing allows an unnecessary loss of highlight detail in the image or loss of shadow detail in the image to be prevented. Further, an image can be obtained in which the region of interest is easier to view.

On the other hand, shooting methods such as large image shooting or fractionated image shooting exist in which a plurality of partial images is obtained by shooting a shooting region of an object while dividing the shooting region into a plurality of shooting ranges. These methods are used to shoot a large object that does not fit in a single image. An image of the whole object can be obtained by joining the individual partial images obtained by large image shooting. U.S. Pat. No. 7,440,559 discusses techniques for converting the gradation of an image obtained by large image shooting. In U.S. Pat. No. 7,440,559, techniques are discussed in which gradation conversion is performed based on a density histogram of a joined image, or based on one partial image.

However, if a joined image is used as an analysis target, the processing load increases, which makes it more difficult to achieve accurate analysis. On the other hand, if the gradation conversion is performed on a large image based on one partial image, since the other partial images are not taken into consideration, the whole large image may not have an appropriate gradation.

SUMMARY OF THE INVENTION

According to an aspect of the present invention, an image processing apparatus includes an image acquisition unit configured to acquire a plurality of partial images obtained by shooting each of a plurality of shooting ranges which a shooting region of an object are divided into, a feature amount acquisition unit configured to acquire a feature amount of at least one of the partial images, a characteristic acquisition unit configured to acquire a gradation conversion processing characteristic based on the feature amount and the shooting region, and a conversion unit configured to convert, based on the processing characteristic, a gradation of an image of the shooting region of the object obtained by joining the partial images.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a flowchart illustrating a flow of the processing performed by the radiation imaging system according to the fifth exemplary embodiment.

DESCRIPTION OF THE EMBODIMENTS

Various exemplary embodiments, features, and aspects of the invention will be described in detail below with reference to the drawings.

A radiation imaging system 100 according to a first exemplary embodiment of the present invention will now be described with reference to FIGS. 1 to 7.

Figure 1:
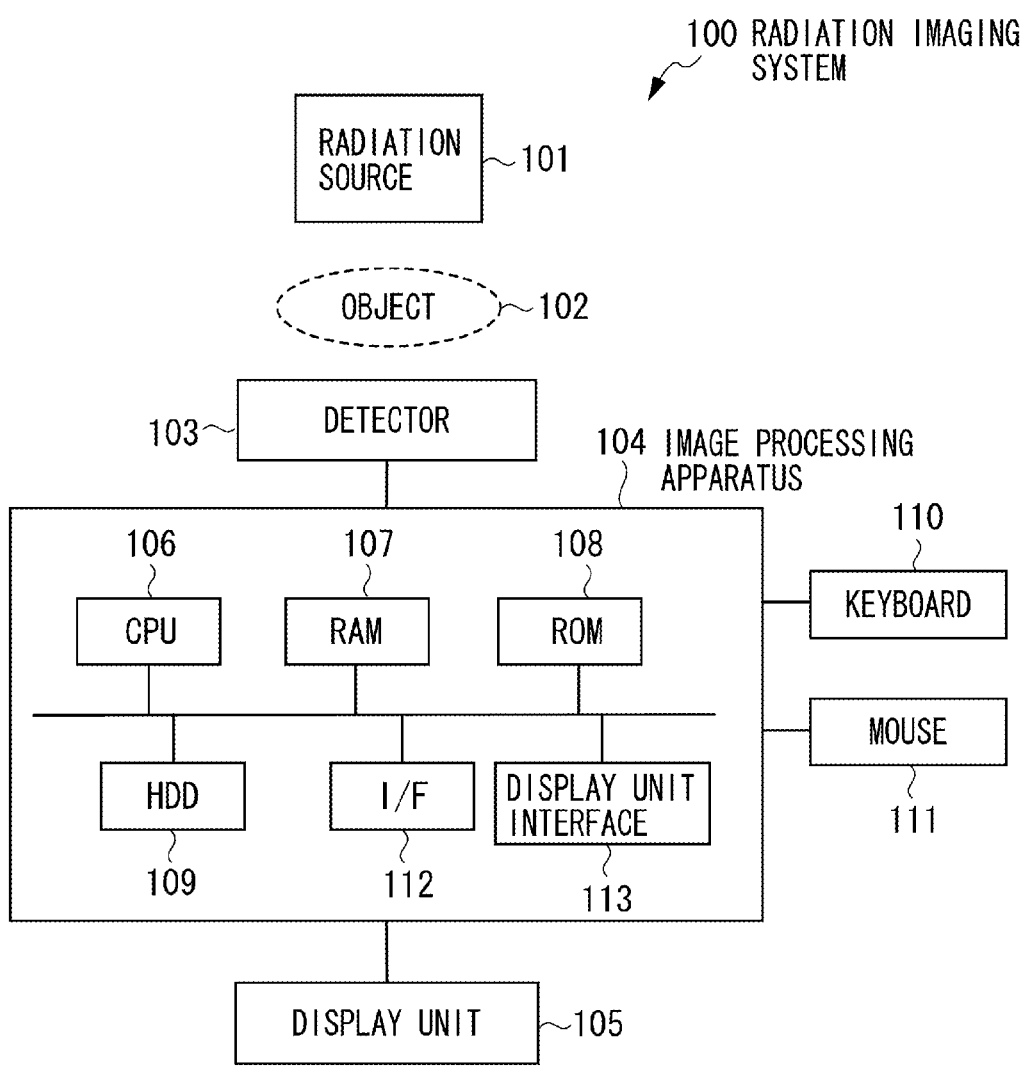
FIG. 1 is a configuration diagram of a radiation imaging system according to a first exemplary embodiment of the present invention.

First, the configuration of the radiation imaging system 100 will be described with reference to FIG. 1. As illustrated in FIG. 1, the radiation imaging system 100 includes a radiation source 101, a detector 103, an image processing apparatus 104, and a display unit 105. The radiation source 101 is configured from an X-ray tube which emits radiation such as X-rays. The radiation source 101 irradiates an object 102 with an appropriate radiation dose for a predetermined time. The detector 103 forms an indirect type flat panel detector (FPD) that has a fluorescence emitter, which converts radiation into visible light, and an image sensor, which receives that visible light and converts it into an electric signal based on the light amount. An electric signal representing an image of the object 102 can be obtained by the detector 103. The detector 103 generates an image of the object by performing a known correction on this electric signal. Since the transmittance of the radiation depends on the substance through which it passes, the internal structure of an object can be visualized based on the image obtained by the detector 103. A direct type FPD which directly converts X-rays into an electric signal may also be used for the detector 103.

Further, the radiation imaging system 100 supports large image shooting, in which a plurality of partial images is obtained by shooting a shooting region of the object 102 while dividing the shooting region into a plurality of shooting ranges. Large image shooting is a shooting method in which a shooting is performed a plurality of times by moving the detector 103 along the object 102 while changing the irradiation direction of the radiation source 101 by a not-illustrated drive unit. Consequently, an image of an object larger than the effective shooting region of the detector 103 can be obtained.

The image processing apparatus 104 generates a large image by joining the plurality of partial images obtained by the large image shooting. The term "large image" refers to an image obtained by joining a plurality of partial images obtained by large image shooting. The image processing apparatus 104 also determines a gradation conversion processing characteristic by analyzing the partial images, and converts the gradation of the large image. Then, the image having a converted gradation is displayed on the display unit 105. Since image information important for diagnosis can be displayed in an easily understood manner by gradation conversion processing, an image can be obtained that can be easily viewed. Such an image is especially useful when performing a diagnosis that involves detailed investigation.

The image processing apparatus 104 includes, as hardware, a central processing unit (CPU) 106, a random access memory (RAM) 107, a read-only memory (ROM) 108, a hard disk drive (HDD) 109, a network interface (I/F) 112, and a display unit interface 113. A keyboard 110 and a mouse 111 are connected to the image processing apparatus 104. A computer program for realizing the respective functional blocks illustrated in FIG. 2, or for executing the below-described processes, is stored in the ROM 108 or the HDD 109. This program is executed by the CPU 106 in the RAM 107 to realize the below-described functions of the image processing apparatus 104. Although in FIG. 1 the CPU 106 is illustrated as only one block, the present invention is not limited to this. A plurality of CPUs 106 may be included.

Figure 2:
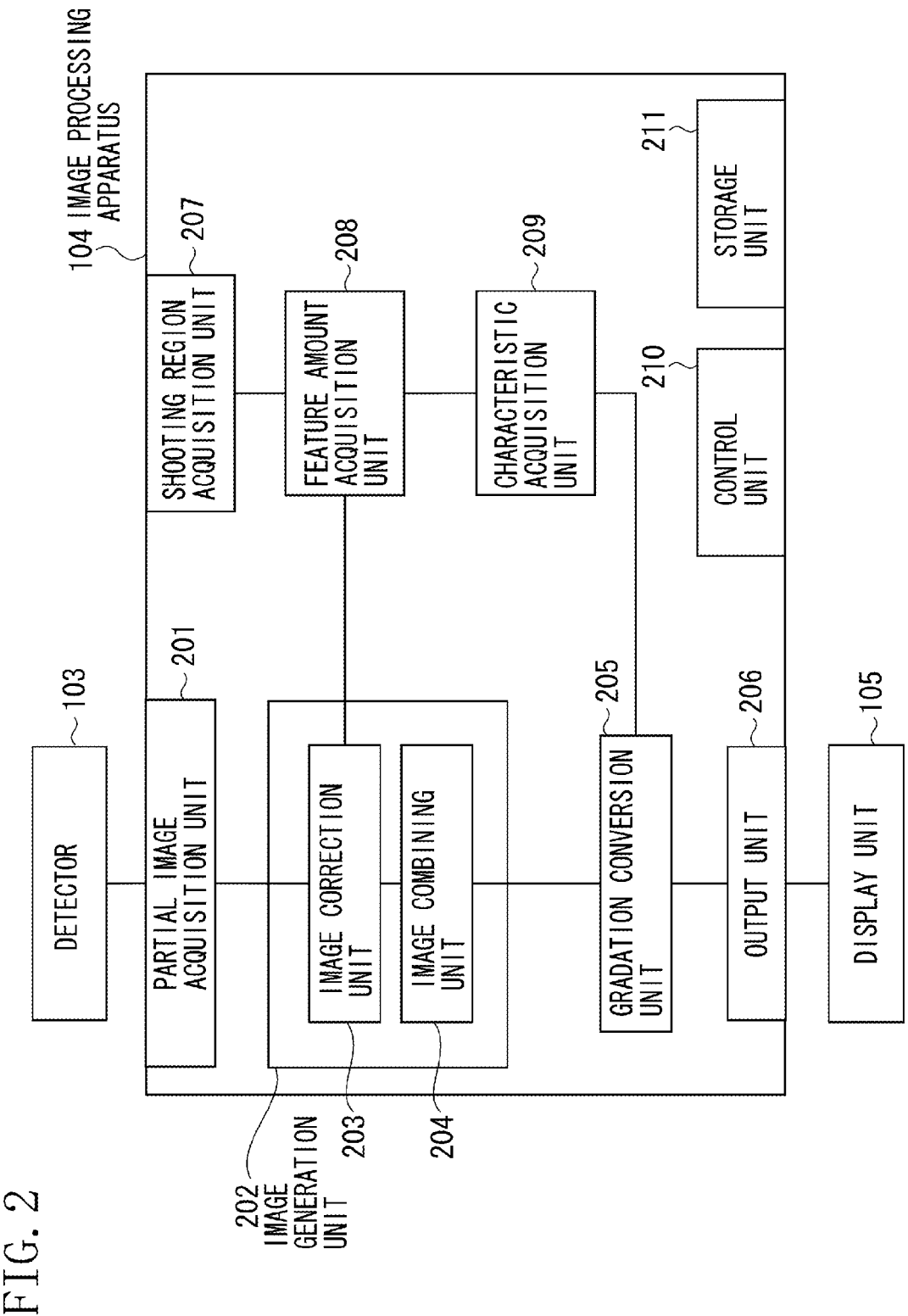
FIG. 2 illustrates a configuration of an image processing apparatus according to the first exemplary embodiment.

The configuration of the image processing apparatus 104 will now be described in more detail with reference to FIG. 2. The image processing apparatus 104 includes a partial image acquisition unit 201, an image generation unit 202 for generating a large image, a gradation conversion unit 205, an output unit 206, a shooting region acquisition unit 207, a feature amount acquisition unit 208, a characteristic acquisition unit 209 for acquiring a gradation conversion processing characteristic, a control unit 210, and a storage unit 211.

The image generation unit 202 includes an image correction unit 203 for correcting a pixel value of a partial image acquired by the partial image acquisition unit 201, and an image combining unit 204 for positioning the partial images and joining and combining them at an overlapping region.

Figure 3:
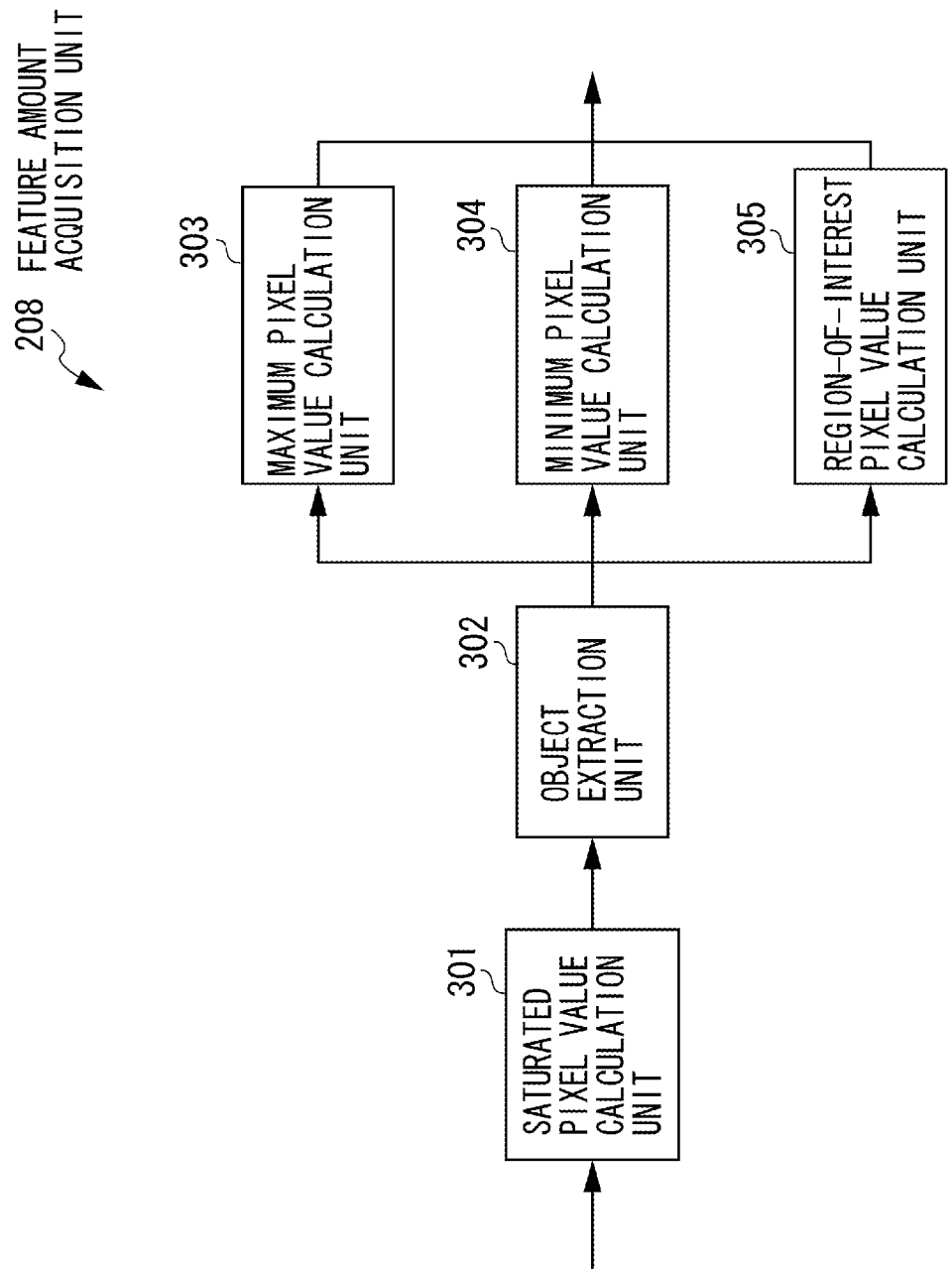
FIG. 3 illustrates a configuration of a feature amount acquisition unit according to the first exemplary embodiment.

As illustrated in FIG. 3, the feature amount acquisition unit 208 includes a saturated pixel value calculation unit 301, an object extraction unit 302, a maximum pixel value calculation unit 303, a minimum pixel value calculation unit 304, and a region-of-interest pixel value calculation unit 305. These calculation units in the feature amount acquisition unit 208 calculate a feature amount by analyzing each partial image based on information about the shooting region obtained by the shooting region acquisition unit 207. These partial images are partial images that are acquired by the partial image acquisition unit 201 and corrected by the image correction unit 203. The obtained feature amounts include a saturated pixel value of each partial image, the maximum pixel value in the object, and the minimum pixel value in the object, and the region-of-interest pixel value. Thus, since the feature amounts are calculated by executing each analysis process on the partial image, the accuracy of the analysis processing is better than when analyzing the whole large image. Further, the time required for the analysis processing can be shortened.

The characteristic acquisition unit 209 acquires a gradation conversion processing characteristic from the feature amounts by a method based on the shooting region. This "processing characteristic" is a characteristic such as a function used in gradation conversion or a lookup table. In the present exemplary embodiment, since a function is used for gradation conversion, the parameter needed to define the gradation conversion function is acquired as the gradation conversion processing characteristic. When the shooting region is determined, since the general tendency of the pixel values in the shooting target is determined, gradation conversion based on the shooting region can be performed. The method for acquiring the gradation conversion processing characteristic will be described below.

The control unit 210 controls each of the above-described functions in an integrated manner.

Information about the region of interest that is needed in order for the feature amount acquisition unit 208 to acquire the region-of-interest pixel value is associated with the shooting region and is stored in the storage unit 211. The feature amount acquisition unit 208 acquires the region-of-interest pixel value by referring to this information. Further, the name of the function for acquiring the parameter used by the characteristic acquisition unit 209 in gradation conversion based on the feature amount is associated with the shooting region and is stored in the storage unit 211. The function for acquiring this feature amount can be executed by the characteristic acquisition unit 209. The characteristic acquisition unit 209 acquires the gradation conversion function as the processing characteristic for gradation conversion by referring to this information.

Figure 4:
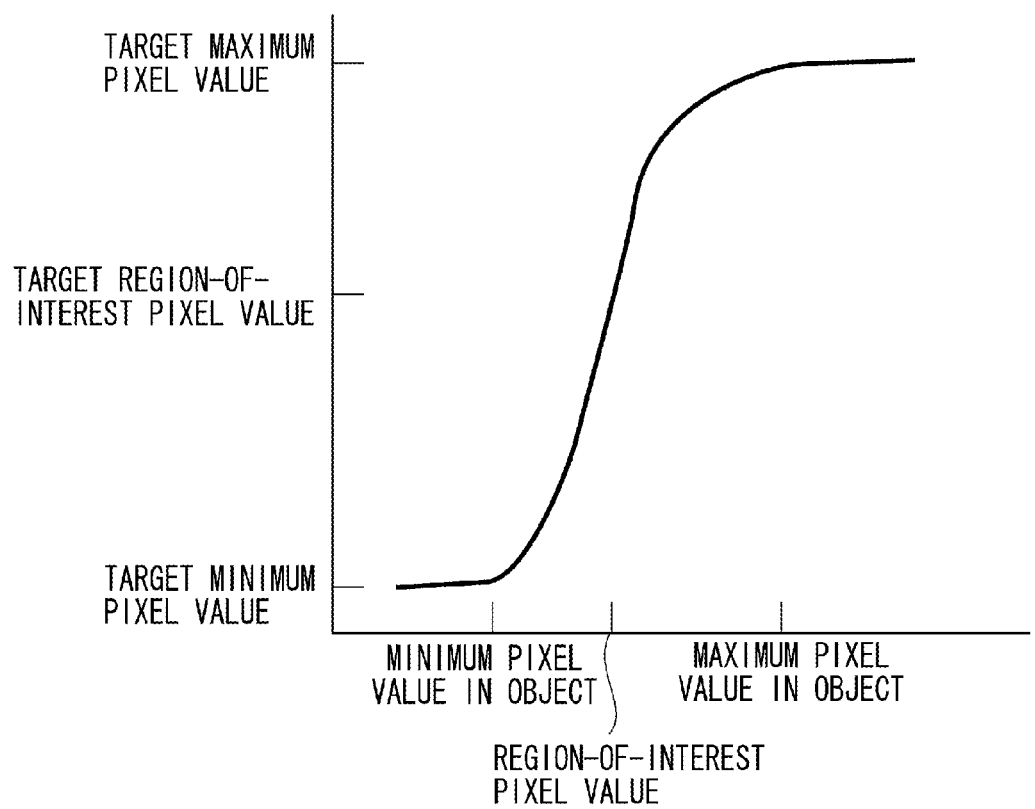
FIG. 4 illustrates an example of a gradation conversion function produced by the image processing apparatus.

An outline of the processing for producing the gradation conversion function performed by the characteristic acquisition unit 209 will now be described with reference to FIG. 4.

First, based on the saturated pixel values obtained as the feature amount from each partial image, the saturated pixel value for the whole large image is determined by a method based on the shooting region. Then, a pixel having a value equal to or greater than this saturated pixel value is clipped as the maximum value in the image.

Next, target values for the post-conversion minimum pixel value, maximum pixel value, and region-of-interest pixel value are set. These target values are set based on the output gradation number and how much the region of interest should be highlighted. Therefore, the target values may be determined based on the shooting region, or set using a prescribed value regardless of the shooting region. Thus, the gradation conversion function illustrated in FIG. 4 is determined.

Figure 5:
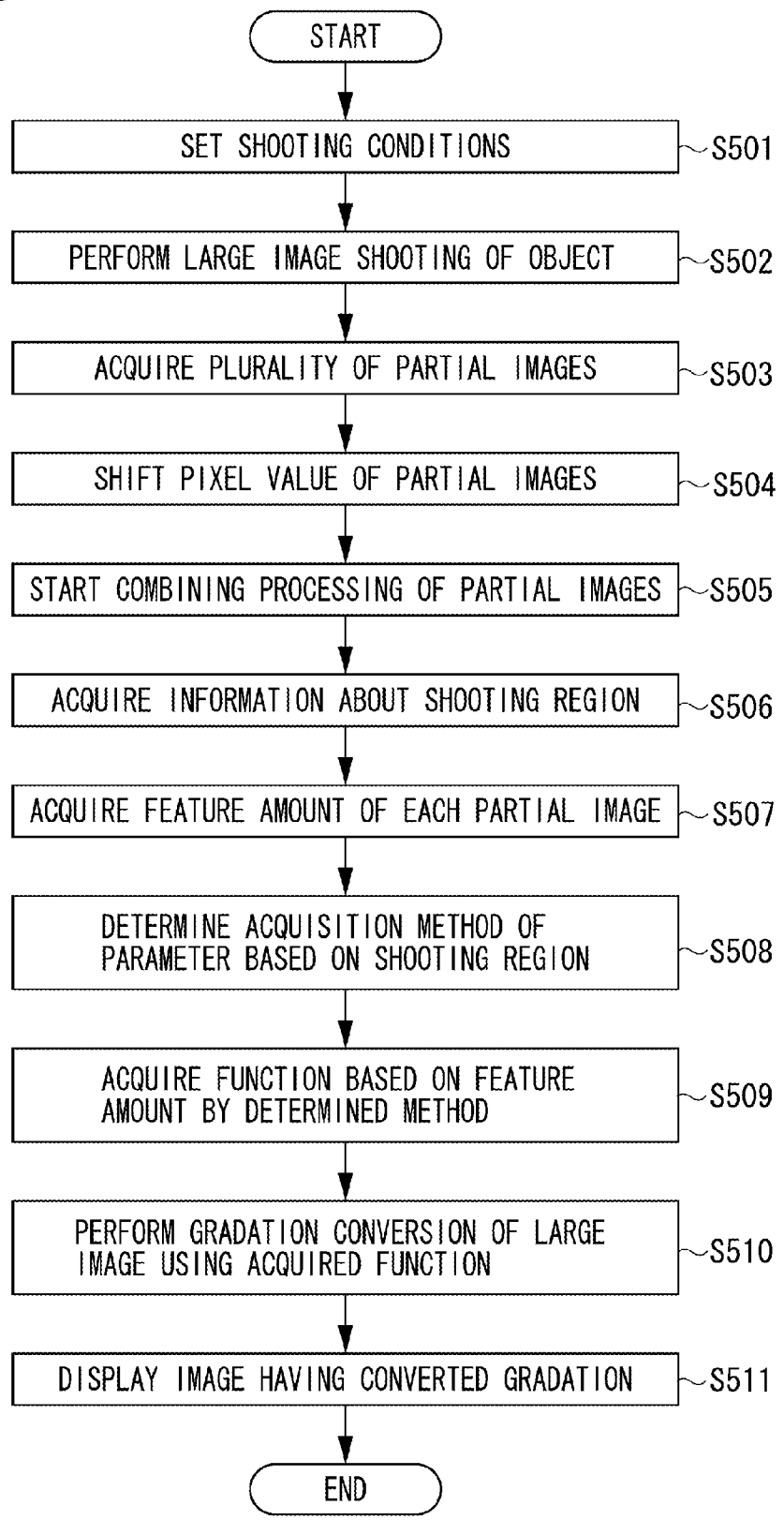
FIG. 5 is a flowchart illustrating a flow of the processing performed by the radiation imaging system according to the first exemplary embodiment.

The flow of the processing executed by the radiation imaging system 100 will now be described with reference to FIG. 5. First, in step S501, the shooting conditions of the object are set based on inputs from the keyboard 110 and the mouse 111. The shooting conditions may also be set by receiving shooting order information from an external information system. These shooting conditions include information about the shooting region that indicates which region of the object is to be shot. The shooting conditions are stored in the storage unit 211 of the image processing apparatus 104.

In step S502, the object 102 is shot by driving the radiation source 101 and the detector 103 based on the set shooting conditions. In the present exemplary embodiment, if the shooting region of the object 102 is larger than the region that can be shot by the detector 103, large image shooting is performed by dividing the object into a plurality of shooting ranges and shooting a plurality of times. Based on the large image shooting, the detector 103 produces a plurality of partial images obtained by shooting a part of the shooting region of the object.

In step S503, the partial image acquisition unit 201 of the image processing apparatus 104 acquires the plurality of partial images obtained by large image shooting. The partial images are associated with information indicating what number image the partial image was shot as, and information indicating the total number of partial images obtained by large image shooting as supplementary information.

In step S504, the image correction unit 203 of the image generation unit 202 corrects the pixel values of the plurality of acquired partial images. As the pixel value correction method, a method can be used in which the pixel value of each overall image is shifted using an average value of overlapping regions as in a conventional method, then performing pixel value correction to approximately match the pixel values of the overlapping regions. Here, "approximately match" does not have to be strictly interpreted. For example, "approximately match" may mean that the average value of the pixel values in common regions is made lower than a predetermined threshold. In addition, the pixel value correction can also be performed by minimizing a difference value in a histogram of the overlapping regions.

In step S505, the control unit 210 starts the processing for combining the pixel-corrected partial images in the image combining unit 204. The image combining unit 204 positions the plurality of shot partial images, and combines the partial images to generate a large image. As the method for combining the images, a known method is used, in which the contribution rate of each image is varied in stages based on the distance from a connecting point at the region where the images overlap each other. The positioning may be performed based on an image feature by the image combining unit 204, or performed by the user performing a manual adjustment.

The processing to determine the gradation conversion function from steps S506 to S509 is performed in parallel with the image combining processing started in step S505. Consequently, the time from shooting until the large image having a converted gradation is displayed on the display unit 105 can be shortened. Further, the partial images acquired by the partial image acquisition unit 201 can be sequentially analyzed during the large image shooting of the object 102. Performing the processing in this manner allows the processing time to be shortened.

In step S506, the shooting region acquisition unit 207 acquires the shooting region from the information about the shooting conditions stored in the storage unit 211.

In step S507, the feature amount acquisition unit 208 acquires the feature amounts by analyzing the partial images having a shifted pixel value. The acquired feature amounts are the maximum pixel value in the object, the minimum pixel value, the region-of-interest pixel value, and the saturated pixel value. These feature amounts are acquired for each partial image.

The saturated pixel value calculation unit 301 calculates the saturated pixel value of the partial images on which pixel value correction has been performed. The calculation of the saturated pixel value may be performed using a method that employs a sensor characteristic.

The object extraction unit 302 extracts the object that remains after removing from the partial images the portion on which the X-rays were incident on the direct X-ray flat panel detector without passing through the object and the shielding portion that is shielded by a collimator and the like. The object extraction method may be performed using a method that utilizes histogram analysis and two-dimensional analysis results.

The maximum pixel value calculation unit 303 calculates the maximum value in the object portion. As the method for calculating the maximum pixel value, a method which calculates a representative value from a histogram of the image may be used. However, the present invention is not limited to this. Any method for calculating the maximum pixel value may be applied.

The minimum pixel value calculation unit 304 calculates the minimum value in the object portion in parallel with the maximum value calculation processing performed by the maximum pixel value calculation unit 303. As the method for calculating the minimum pixel value, a method which calculates a representative value from a histogram of the image may be used.

The region-of-interest pixel value calculation unit 305 calculates the region-of-interest pixel value in the object. As the method for calculating the pixel value, a method which calculates a representative value from an image histogram or a method which extracts the region of interest from a two-dimensional structure of the image and acquires a statistical value therefrom as a representative value may be used. Since the information used to specify the region of interest is stored in the storage unit 211 for each shooting region, the region-of-interest pixel value calculation unit 305 performs the processing by referring to this information. This processing is executed for each partial image. Based on the processing in step S507, four types of feature amount are obtained for each partial image.

In step S508, the characteristic acquisition unit 209 determines the method for acquiring the parameter to be used in the gradation conversion from the feature amounts based on information about the shooting region. As described above, information about the shooting region and information indicating the method for acquiring the parameter from the feature amounts are associated with each other and stored in the storage unit 211. The characteristic acquisition unit 209 refers to this information to determine the parameter acquisition method.

First, the characteristic acquisition unit 209 acquires the saturated pixel value of the large image based on the saturated pixel value in each partial image. For example, when shooting the whole length of the lower limbs, among the saturated pixel values obtained from each partial image, one of the lowest values is selected for use as the saturated pixel value for the combined image. Selecting the lowest value allows pixels having a greater pixel value than the lowest pixel value calculated as the saturated pixel value to be clipped. Since the thickness of the lower limbs does not change much along their whole length, there is little likelihood of mistakenly taking a normal pixel as a saturated pixel. Consequently, by clipping the pixel values that are greater than the saturated pixel value, the influence of saturated pixels can be reduced. On the other hand, when shooting the entire spinal column, examples of the used method include a method in which the average pixel value of the saturated pixel values obtained for each of a plurality of selected partial images is calculated and then this average value is taken as the saturated pixel value of the combined image, a method in which a median value of the saturated pixel values of each partial image is calculated, and a method in which the maximum value is used. If there is an error in the saturated pixel value calculation of the respective partial images, using the average value or the median value reduces the effect of the error, which enables stable clipping processing to be performed. Further, the methods that calculate an average value or a median value for the saturated pixel value are effective when shooting under conditions that do not fluctuate with every partial image shot, such as the shooting dose and the distance between the focus and the sensor. When shooting the entire spinal column, since the difference in the thickness of the object is large, using the maximum value allows errors in which normal pixels are clipped to be decreased. Thus, the optimum saturated pixel value can be calculated by selecting the optimum calculation method based on the shooting conditions.

Further, the characteristic acquisition unit 209 acquires the maximum pixel value of the large image based on the object maximum value in each partial image. When shooting a region whose thickness greatly changes like the entire spinal column, the characteristic acquisition unit 209 acquires the largest pixel value from among the maximum pixel values of the respective partial images as the maximum pixel value. The characteristic acquisition unit 209 also acquires the lowest pixel value from among the minimum pixel values of the respective partial images. For the entire spinal column, since the difference between thick portions and thin portions in the object is large, gradation that reflects this variation can be achieved. On the other hand, when shooting a region in which the object thickness does not vary much, such as the total length of the lower limbs, the average value or median value of both the maximum and minimum pixel values of each partial image is calculated. If the average value or median value is used, even if there is an error in the calculation of the maximum pixel value/minimum pixel value of some of the partial images, since the effect of the error can be reduced, stable gradation processing can be performed. Thus, an object maximum pixel value and an object minimum pixel value that are suited to the diagnosis purpose can be calculated by selecting the calculation method based on the shooting region.

The characteristic acquisition unit 209 also selects the median value based on the region-of-interest pixel value of each partial image and sets this median value as the region-of-interest pixel value of the combined image. By thus selecting the median value, even if there is an error in the region-of-interest pixel value of some of the partial images, the effect of this error can be reduced. Further, the calculation method can use the average value of a plurality of selected region-of-interest pixel values. In addition, by using a value that reflects a plurality of region-of-interest pixel values, even if there is an error in the partial image analysis, the effect of this error can be reduced. For example, when shooting the whole length of the lower limbs, if the region of interest is a bone portion, there are no large differences in the region-of-interest pixel values of each partial image. In such a case, by employing a method in which the region of interest of the large image is set by calculating the median value or the average value, gradation conversion of the bone portion, which is the region of interest, can be suitably performed while reducing the effects of an error in the partial image analysis.

When the region-of-interest pixel values are greatly different, a method is used in which one region-of-interest pixel value is selected from the respective partial images. For example, when shooting the entire spinal column, if the region of interest is the lumbar vertebrae, depending on the partial image, the region-of-interest pixel value of an image obtained by shooting mainly the thoracic vertebrae and that of an image obtained by shooting mainly the lumbar vertebrae can greatly differ. In such a case, the region-of-interest pixel value calculated based on the image obtained by shooting the lumbar vertebrae is selected. Conversely, if the region of interest is the thoracic vertebrae, a gradation conversion function is acquired using a region-of-interest pixel value obtained from an image obtained by mainly shooting the thoracic vertebrae. Further, when shooting the whole body, if the region of interest is a bone portion, there will often be a pixel value in the region-of-interest pixel values of the respective partial images that is greatly different from the other pixel values. In such a case, to exclude the abnormal value from the partial image analysis, the region of interest may be set by discarding the maximum value and the minimum value of the region-of-interest pixel values of the respective partial images and then calculating the average value based on the remaining pixel values. Thus, a region-of-interest pixel value that is suited to the diagnosis purpose can be calculated by selecting the calculation method based on the shooting region.

In step S509, the characteristic acquisition unit 209 acquires a gradation conversion function based on the obtained parameter. Since this processing is the same as that described with reference to FIG. 4, a description thereof will be omitted here.

In step S510, the gradation conversion unit 205 performs gradation conversion of the large image. When the processing for combining the partial images that started in step S505 is finished, the control unit 210 waits for the processing for acquiring the gradation conversion parameter performed in step S509 to finish, and then instructs the gradation conversion unit 205 to start the gradation conversion of the large image. Based on this instruction, the gradation conversion unit 205 converts the gradation of the large image according to the gradation conversion function.

In step S511, the output unit 206 outputs the image having a converted gradation to the display unit 105, and the display unit 105 displays this image.

As described above, by calculating feature amounts by analyzing each partial image obtained by large image shooting, the analysis accuracy can be increased compared with when a joined image is analyzed, and the processing time can be shortened. Further, by producing a gradation conversion function by combining the feature amounts by a method based on the shooting region, gradation conversion of the large image suited to each shooting region can be realized.

In the first exemplary embodiment, four types of feature amount are calculated from each partial image. However, in a second exemplary embodiment of the present invention, only the feature amounts necessary to acquire the gradation conversion function for the region-of-interest pixel value are acquired. The processing for acquiring some of the feature amounts from the partial images is omitted. In the following, a description of constituent elements and processes that are the same as in the first exemplary embodiment will be omitted. Only the features characteristic to the present exemplary embodiment will be described.

The feature amount acquisition unit 208 performs processing for determining the type of feature amount to be acquired from each image based on information about the shooting region. For example, when shooting the whole length of the lower limbs, if the region of interest is a bone portion, there are no large differences in the region-of-interest pixel values of the respective partial images. Therefore, information specifying any one of the partial images showing the bone portion is associated with information about the shooting region and stored in the storage unit 211. The feature amount acquisition unit 208 refers to this information and acquires the region-of-interest pixel value from only the specified partial image.

As another example, when shooting the entire spinal column, as described above, if the region of interest is the lumbar vertebrae, the region-of-interest pixel value of an image obtained by shooting mainly the thoracic vertebrae and that of an image obtained by shooting mainly the lumbar vertebrae can greatly differ. Therefore, if the lumbar vertebrae is pre-set as the region of interest, the region-of-interest pixel value is acquired from only the partial image obtained by shooting the lumbar vertebrae.

As yet another example, if there is a plurality of regions of interest in a large image of a lumbar vertebrae, a thoracic vertebrae or the like, and if the width of the pixel value distribution in each region of interest is large, with just one image, the highlighting of the whole region of interest may not be sufficient or the image may be unnatural. Therefore, unnatural gradation can be prevented by acquiring the region-of-interest pixel value from only a partial image specified based on the shooting region and performing the gradation conversion based on this value.

Thus, by performing analysis processing on a partial image specified based on information about the shooting region, the need to perform analysis processing for all of the partial images is eliminated. Consequently, the processing time can be shortened and the processing load can be reduced.

Further, in the present exemplary embodiment, among the respective partial images, the feature amount acquisition unit 208 extracts feature amounts only from regions that do not overlap other partial images. This is because in large image shooting, the regions that include a lot of the information needed for diagnosis are often shot by adjusting the shooting position so that they do not overlap, so that the analysis can be performed by omitting overlapping regions. In addition, in the above exemplary embodiments, since the combining processing and the analysis processing of the partial images are performed in parallel, the pixel values of overlapping regions vary depending on the combining processing. Therefore, the analysis accuracy can deteriorate. By setting only non-overlapping regions as the analysis target, the accuracy of the analysis processing for acquiring the gradation conversion function can be increased and the processing time can be reduced.

In a third exemplary embodiment of the present invention, the region of interest in one large image is divided up into predetermined groups, such as the lumbar vertebrae and the thoracic vertebrae when shooting the entire spinal column for example, and a gradation conversion function is acquired for each group. The grouping setting is associated with information about the shooting region and is pre-stored in the storage unit 211. For example, when shooting the entire spinal column, because there is a large difference in the pixel distribution between the lumbar vertebrae and the thoracic vertebrae, each of these is set as a separate group. Conversely, when shooting the whole length of the lower limbs and setting a bone portion as the region of interest, since the difference in the region-of-interest pixel values obtained from the plurality of partial images is not that great, these regions of interest are set as the same group. This grouping may be manually set using the keyboard 110 and the mouse 111 for each shooting region. The feature amount acquisition unit 208 refers to this information to acquire the feature amounts from each partial image for acquiring the gradation conversion function corresponding to each group. Similar to the first exemplary embodiment, the types of feature amount include the saturated pixel value, the minimum pixel value in the object, the maximum pixel value in the object, and the region-of-interest pixel value. The characteristic acquisition unit 209 acquires the gradation conversion function based on the acquired feature amounts.

A specific example of the processing will now be described. The processing of the minimum pixel value and the maximum pixel value of the large image is performed in the same manner as in the first exemplary embodiment for both a large image of an entire spinal column and a large image of the whole length of the lower limbs. Concerning the region-of-interest pixel value, when shooting the entire spinal column, a gradation conversion function that highlights the region-of-interest pixel value obtained from the lumbar vertebrae and a gradation conversion function that highlights the region-of-interest pixel value obtained from the thoracic vertebrae are produced. On the other hand, when shooting the whole length of the lower limbs, a pixel value of a bone portion is acquired from one partial image, and a gradation conversion function for highlighting this pixel value is acquired.

Thus, by acquiring a gradation conversion function for each group, a gradation conversion function can be acquired for each region of interest having a similar pixel value distribution. Compared with when producing a gradation conversion function for each partial image, when there are region of interests having a greatly different pixel value distribution in the partial images, since separate gradation conversion functions corresponding to each region of interest are produced, an image that suitably highlights the different regions of interest can be produced. Further, when there are regions of interest having similar pixel value distributions that straddle a plurality of partial images, since these regions of interest can be collectively highlighted by one gradation conversion function, the function production processing performed by the characteristic acquisition unit 209 and the processing load of the gradation conversion unit 205 can be reduced. Further, instead of grouping the regions of interest, the partial images may be grouped.

In a fourth exemplary embodiment of the present invention, a plurality of gradation conversion functions is acquired based on the shooting region.

Although a large image obtained by large image shooting can be considered to have a wide image region with a plurality of regions of interest, because the image region is large the dynamic range is also large. Consequently, it is necessary to prepare a plurality of gradation conversion functions and use these functions based on the purpose of diagnosis.

Therefore, unlike the second exemplary embodiment, but similar to the first exemplary embodiment, in the fourth exemplary embodiment the saturated pixel value, the maximum and minimum pixel values in the object, and the region-of-interest pixel value are acquired from each partial image, and a plurality of gradation conversion functions is acquired. In the fourth exemplary embodiment, concerning the region of interest, regardless of the shooting region, the number of gradation conversion functions in which the region-of-interest pixel value obtained from each partial image serves as the region-of-interest pixel value for the whole large image that is produced is only the number of region-of-interest pixel values. In this case, since it is not necessary to change the type of feature amount acquired based on the information about the shooting region, the apparatus configuration or the processing may be simplified.

In addition, the average value or median value of the region-of-interest pixel value obtained from each partial image is determined, and this value is used to acquire the gradation conversion function. When selecting large image shooting, the user may wish to view the tendency of the whole large image. A large image that satisfies this desire can be obtained by using an image that shows the tendency of the whole image.

In the present exemplary embodiment, a pre-gradation conversion large image is displayed on the display unit 105 by omitting the gradation conversion processing performed by the gradation conversion unit 205. Further, this large image is displayed as sequential options in the order that the gradation conversion functions produced in parallel were produced. The control unit 210 performs control so that the large image is subjected to a different gradation conversion based on a selection input by the keyboard 110 and the mouse 111.

Thus, since the acquisition processing of the gradation conversion function is executed in parallel with the generation processing of the large image, the gradation conversion function options can be presented to the user more quickly than when the production of the gradation conversion function is started after the large image is generated.

In a fifth exemplary embodiment of the present invention, unlike the above exemplary embodiments, the gradation conversion parameter is acquired based on the size of the region-of-interest pixel value in a partial image, without using information about the shooting region.

Figure 6:
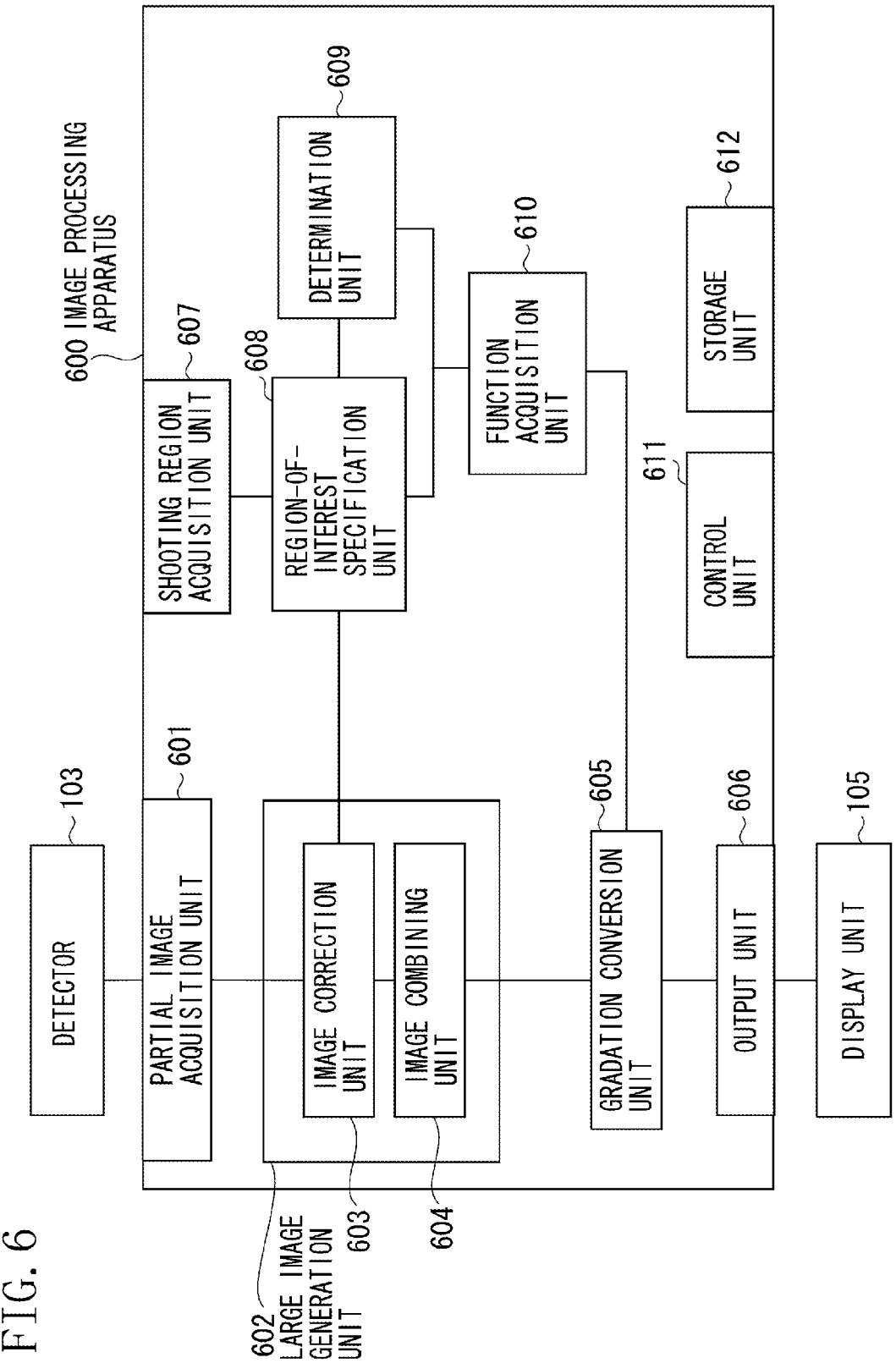
FIG. 6 illustrates a configuration of an image processing apparatus according to a fifth exemplary embodiment of the present invention.

A configuration of an image processing apparatus 600 will now be described with reference to FIG. 6. The differences with the above exemplary embodiments are that the image processing apparatus 600 has a region-of-interest specification unit 608 and a determination unit 609.

Next, a flow of the processing executed by the radiation imaging system 100 will be described with reference to FIG. 7.

In step S701, the radiation source 101 emits radiation based on an external instruction. The detector 103 detects radiation that has passed through the object 102, and generates a radiation image of the object.

In step S702, a partial image acquisition unit 601 of an image processing apparatus 600 acquires the radiation image from the detector 103 via the I/F 112. The acquired image is sent to a large image generation unit 602 by a control unit 611, and is also stored in a storage unit 612.

In step S703, an image correction unit 603 performs correction processing in which the pixel value of each image is shifted so that the pixel value levels for regions common to each other in each image match. Since differences among the pixel value levels in each image are eliminated by this processing, the pixel values in regions that should have the same pixel value over the whole large image can be made roughly the same by the subsequently-performed processing for combining common regions. In addition, since only overlapping regions are the processing target in the combining processing, there is an advantage that the feature amounts acquired from each partial image after this pixel value correction but before the combining processing are values that are generally unchanged from acquisition from the large image after the combining processing.

In step S704, the control unit 611 starts in parallel the combining processing performed by an image combining unit 604 and the specification processing of the region of interest performed by the region-of-interest specification unit 608. These processes may start simultaneously or slightly before or after each other.

In step S705, the image combining unit 604 combines regions common to the plurality of corrected images. Parallel with this processing, in step S706, the region-of-interest specification unit 608 specifies a region of interest.

In step S707, the determination unit 609 calculates a value indicating the width of the pixel values in the region of interest. In the present exemplary embodiment, the determination unit 609 extracts the minimum pixel value and the maximum pixel value in the region of interest, calculates the difference between these values, and takes this difference as the pixel value width.

In step S708, the determination unit 609 determines whether the value indicating the pixel value width is included in a predetermined range. This predetermined range is set by the control unit 611 as a range from 0 to a threshold that is pre-stored in the storage unit 612. If it is determined by the region-of-interest specification unit 608 that the value is included in the predetermined range (NO in step S708), the processing proceeds to step S709. In step S709, the region-of-interest specification unit 608 sets the whole image as a region to be highlighted, and acquires the function for converting the gradation of the region set by a function acquisition unit 610.

On the other hand, if it is determined in step S708 by the region-of-interest specification unit 608 that the value of the pixel value width exceeds the predetermined range (YES in step S708), the processing proceeds to step S710. In step S710, the region-of-interest specification unit 608 divides the image into a plurality of regions. This processing is performed by setting the number of regions to be divided by referring to a table for setting the association between the value of the pixel value width and the number of regions. This table is stored in the storage unit 612. Alternatively, this processing may be performed by determining the pixel value width that can be highlighted by each gradation conversion, and dividing the image into regions that fit within that width. Then, in step S710, the function acquisition unit 610 acquires the function for gradation conversion corresponding to each region.

If there are three or more regions set by the region-of-interest specification unit 608, regions having a similar pixel value distribution may be grouped together as in the fourth exemplary embodiment, and the gradation conversion may be performed for each group. In this case, the region-of-interest specification unit 608 functions as a grouping processing unit which groups regions having a similar pixel value distribution together. This grouping can be performed using a known clustering technique. Consequently, the gradation of the region of interest can be appropriately converted while preventing the complexity that arises when converted images are individually generated for each gradation conversion. On the other hand, the parameter for individually converting the gradation of the regions can be acquired without performing grouping. In this case, each region can be brought to the attention of the diagnostician by individually generating a converted image for each region.

In step S711, a gradation conversion unit 605 converts the gradation of the image based on the produced gradation conversion function. If a plurality of gradation conversion functions is acquired in step S710, the number of acquired images having a converted gradation is the same as the number of functions. The processing for applying these functions on the large image may be performed based on the acquisition of the function by the gradation conversion unit 605. Alternatively, a system that is easy to use in terms of preventing the execution of unnecessary processing may be provided by performing sequential gradation conversion based on inputs by the user.

In step S712, an output unit 606 displays this image having a corrected gradation on the display unit 105. The diagnostician can perform a diagnosis by viewing the displayed image.

Thus, acquiring the parameter to be used in gradation conversion from a plurality of images that have been corrected by the image correction unit 603 allows a gradation conversion parameter to be acquired that is roughly the same as when acquired from the large image. Further, since the image serving as the analysis target has been divided, the analysis processing load is not as great as when analyzing as a single image. In addition, performing the combining processing of the image in parallel with acquiring the gradation conversion parameter allows the processing time to be shortened. Consequently, a large image having a region of interest whose gradation has been appropriately converted can be output more quickly after shooting while also shortening the processing time.

Further, gradation can also be converted by removing regions outside of the object and regions in the object that are less important by specifying the region of interest and dividing that region into at least one region. In addition, the gradation may also be converted so as to highlight the region that the diagnostician should pay interest to. Especially, when the pixel value width of the region of interest is large, since the image is generated after the region of interest is divided into a plurality of regions and is subjected to highlighting processing, an image can be generated that has a highlighted region of interest without harming the gradation balance of the whole image. Moreover, gradation can be realized that more closely reflects the differences in the object than when using information about the shooting region.

By performing the processing described in the first to third exemplary embodiments based on information about a region-of-interest pixel value without using information about the shooting region, an appropriate gradation can be achieved that reflects the individual differences of each object. Conversely, such processing can also be performed using table information associated with the shooting region. In this case, stable gradation based on the region can be realized. In addition, information about the shooting region and information about a region-of-interest pixel value may be used together.

According to the above exemplary embodiments, by acquiring feature amounts from partial images and acquiring a gradation conversion function of the joined image, the time required for analysis processing can be reduced more than when the whole of a large-sized image is analyzed. Therefore, good accuracy and a fast processing time can both be realized despite the fact that there are time limitations on the time it takes until a shot image is displayed. Further, by combining the feature amounts of the partial images based on the shooting region, accuracy and processing time comparable to when analyzing the whole image can be achieved. In addition, since the shooting region is associated with the combination method, highly accurate gradation conversion can be obtained in a short time just by having the user specify the shooting region.

Further, by performing the partial image joining processing and the partial image analysis processing for obtaining gradation conversion in parallel, the processing time can be shortened. Since the joining processing includes analysis processing of the images, the processing load of the correction of the pixel value levels among the partial images and the positioning processing of the pixels is high. Further, this processing takes time. From the perspective of preventing a wrong diagnosis, when manually performing the pixel value level correction and the positioning processing to improve accuracy, more time is required than when only performing automatic joining processing. On the other hand, since the analysis processing for obtaining the gradation conversion processing characteristic also requires image analysis, the processing takes time. Even if the processing characteristic could be manually set without having to analyze the image, this still takes up time the same as in automatic processing. In the present exemplary embodiment, by performing the time consuming joining processing and the gradation conversion characteristic acquisition processing in parallel, the time lag until the large image is displayed after shooting can be substantially reduced. In addition, each time a partial image of the object is shot, the analysis processing of the shot partial images can be performed while the next partial image is being shot. When shooting the partial images, since the processing for moving the X-ray tube and the flat panel detector takes time, by performing the analysis processing in parallel with fractionated shooting, the display lag time can be greatly shortened.

The gradation of the joined image can be set appropriately for the diagnosis by using the above-described processing for acquiring the gradation conversion processing characteristic of the joined image for the radiation image and the X-ray image. Especially, since X-ray images are displayed in monochrome, using an image that has an appropriately-adjusted gradation allows the diagnostician to perform a diagnosis efficiently.

In the above exemplary embodiments, the feature amounts are acquired by analyzing partial images whose pixel values had undergone shift correction by the image correction unit 203. However, the gradation conversion parameter acquisition processing and the shift correction processing may be performed in parallel. In addition to the pixel value of the feature amounts obtained by the feature amount acquisition unit 208, the image correction unit 203 can also use the pixel value shift amount of the partial images in the production of the gradation conversion function performed by the characteristic acquisition unit 209.

The gradation conversion does not have to be performed based on a function, and a lookup table for gradation conversion can also be used. In this case, the characteristic acquisition unit 209 acquires a coefficient for converting each partial image in the large image, not a parameter for determining the function form. Further, the gradation conversion processing characteristic can also be determined by fixing the curve form of the gradation conversion and shifting the curve based on the feature amounts of the large image. For example, the shifting may be performed by using the region-of-interest pixel value as a reference.

The present invention may be realized as an image processing system in which the processing performed by the image processing apparatus is distributed across a plurality of apparatuses. The present invention may also be realized by distributing processing organized as a single functional block across a plurality of functional blocks. Further, the present invention can be realized by an imaging apparatus which includes the functions of the image processing apparatus and the display apparatus in the above exemplary embodiments in the imaging apparatus or the detector. Alternatively, the present invention may be realized by mounting processing organized as a single functional block as one or a plurality of hardware circuits.

The present invention also includes cases where, for example, the operating system (OS) or the like running on an electronic computing device performs part or all of the actual processing, and from that processing the functions of the above-described exemplary embodiments are realized. Further, a plurality of CPUs may be included in the computer. In such a case, the present invention may be realized by distributing across the plurality of CPUs. In addition, in this case the program code itself read from a storage medium realizes the functions of the exemplary embodiments, so that the storage medium which stores that program or program code constitutes the present invention.

The above description of the exemplary embodiments is an example of an image processing apparatus. The present invention is not limited to this description.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-153224 filed Jul. 5, 2010, which is hereby incorporated by reference herein in its entirety.

What is claimed is:

1. An image processing apparatus for radiation images, the apparatus comprising:
a condition acquisition unit configured to acquire conditions for performing radiation imaging, including information indicating an anatomical region to be imaged;
an image acquisition unit configured to acquire partial images obtained by shooting partial regions of an entire shooting region, respectively, wherein the entire shooting region corresponds to the acquired information indicating an anatomical region to be imaged;
a correction unit configured to acquire a correction value for shifting a pixel value of at least one of the partial regions so that a difference between pixel values of regions common to the partial images is reduced;
a feature amount acquisition unit configured to acquire a feature amount of at least one of the partial images based on the acquired information indicating an anatomical region to be imaged, wherein the acquired feature amount is for gradation conversion processing;
a characteristic acquisition unit configured to acquire a gradation conversion processing characteristic based on the acquired correction value and the acquired feature amount; and
an image processing unit configured to perform, based on the acquired correction value and the processing characteristic, image processing on an image acquired by joining the partial images, to acquire a processed image, wherein gradation of the processed image has been converted.

2. The image processing apparatus according to claim 1, further comprising a determination unit configured to determine, according to the acquired information indicating the anatomical region, a feature amount acquired from each of the partial images and a method for acquiring a gradation conversion processing characteristic from the acquired feature amount.

3. The image processing apparatus according to claim 1, further comprising a determination unit configured to determine from which partial image a pixel value of a region of interest in an object is acquired as the feature amount.

4. The image processing apparatus according to claim 1, further comprising a determination unit configured to determine a process for acquiring the processing characteristic, based on an average value or a median value of pixel values of a region of interest in an object, wherein the region of interest is obtained from the partial images.

5. The image processing apparatus according to claim 1, wherein the feature amount acquisition unit is configured to acquire the feature amount from a region of the partial image that does not overlap with another partial image.

6. The image processing apparatus according to claim 1, wherein the correction unit is configured to shift, based on the acquired correction value, a pixel value of at least one of the partial images, and to approximately match a pixel value representative of a region common of the partial images, wherein the characteristic acquisition unit is configured to acquire the gradation conversion processing characteristic based on the at least one of the partial images.

7. The image processing apparatus according to claim 1, wherein the characteristic acquisition unit is configured to acquire a gradation conversion processing characteristic corresponding to each partial image, and
wherein the image processing apparatus further comprises a control unit configured to display the gradation conversion processing characteristic as an option with the image obtained by joining the partial images, and
wherein the control unit is configured to perform, according to an input for selecting the gradation conversion processing characteristic, gradation conversion of the selected processing characteristic on the image obtained by joining the partial images, and to display the processed image.

8. The image processing apparatus according to claim 1, wherein the feature amount acquisition unit is configured to acquire, as the feature amount, at least one of a maximum pixel value, a minimum pixel value, and a region-of-interest pixel value of an object region shown in the partial images.

9. The image processing apparatus according to claim 1, wherein the acquired gradation conversion processing characteristic is information indicating one of a function used in the gradation conversion and a lookup table used in the gradation conversion.

10. The image processing apparatus according to claim 1, further comprising:
a generation unit configured to generate an image by joining partial images; and
a control unit configured to control the generation unit and the characteristic acquisition unit;
wherein the characteristic acquisition unit is configured to analyze each of the partial images to acquire the gradation conversion processing characteristics; and
wherein the control unit is configured to control the characteristic acquisition unit to perform the analysis in parallel with the generation of the joined image by the generation unit.

11. The image processing apparatus according to claim 1, further comprising:
a processing unit configured to, according to a width of a pixel value distribution for a region of interest in the generated joined image, divide the region of interest into a plurality of groups to be highlighted based on the same gradation conversion;
wherein the characteristic acquisition unit is configured to acquire a gradation conversion processing characteristic corresponding to each of the groups.

12. A radiation imaging system comprising:
the image processing apparatus according to claim 1;
a radiation source configured to emit radiation;
a detector configured to detect radiation emitted from the radiation source and passing through an object, and to convert the detected radiation into an electric signal representing an image of the object; and
a display unit configured to display the converted image.

13. A non-transitory computer-readable storage medium storing a program which, when run on a device, causes the device to act as the image processing apparatus according to claim 1.

14. The image processing apparatus according to claim 1, wherein the feature amount acquisition unit is configured to acquire a plurality of types of feature amounts from at least one of the partial images.

15. The image processing apparatus according to claim 14, further comprising a determination unit configured to determine, based on the acquired information indicating the anatomical region, which of the types of feature amounts obtained from which of the partial images is used for acquiring the processing characteristic,
    wherein the characteristic acquisition unit is configured to acquire a gradation conversion processing characteristic based on a determination of the determination unit.

16. An image processing apparatus for radiation images, comprising:
    a region acquisition unit configured to acquire information indicating an anatomical region;
    an image acquisition unit configured to acquire partial images obtained by shooting partial regions of an entire shooting region, respectively, wherein the entire shooting region corresponds to the acquired information indicating the anatomical region;
    a correction unit configured to acquire a correction value for shifting a pixel value of at least one of the partial images so that a difference between pixel values of regions common to the partial images is reduced;
    a feature amount acquisition unit configured to acquire a feature amount of at least one of the partial images based on the acquired information indicating the anatomical region, wherein the acquired feature amount is for gradation conversion processing;
    a characteristic acquisition unit configured to acquire a gradation conversion processing characteristic based on the acquired correction value and the acquired feature amount; and
    an image processing unit configured to perform, based on the acquired correction value and the processing characteristic, image processing on an image based on the partial images, to acquire a processed image wherein gradation of the processed image has been converted.

17. An image processing method for radiation images, comprising:
    acquiring information indicating an anatomical region;
    acquiring partial images obtained by shooting partial regions of an entire shooting region, respectively, wherein the entire shooting region corresponds to the acquired information indicating the anatomical region;
    acquiring a correction value for shifting a pixel value of at least one of the partial images so that a difference between pixel values of regions common to the partial images is reduced;
    acquiring a feature amount of at least one of the partial images based on the acquired information indicating the anatomical region, wherein the acquired feature amount is for gradation conversion processing;
    acquiring a gradation conversion processing characteristic based on the acquired correction value and the acquired feature amount; and
    performing, based on the acquired correction value and the processing characteristic, image processing on an image based on the partial images, to acquire a processed image wherein gradation of the processed image has been converted.

18. An image processing method for radiation images, the method comprising:
    acquiring conditions for performing radiation imaging, including information indicating an anatomical region to be imaged;
    acquiring partial images obtained by shooting partial regions of an entire shooting region, respectively, wherein the entire shooting region corresponds to the acquired information indicating an anatomical region to be imaged;
    acquiring a correction value for shifting a pixel value of at least one of the partial images so that a difference between pixel values of regions common to the partial images is reduced;
    acquiring a feature amount of at least one of the partial images based on the acquired information indicating an anatomical region to be imaged, wherein the acquired feature amount is for gradation conversion processing;
    acquiring a gradation conversion processing characteristic based on the acquired correction value and the acquired feature amount; and
    performing, based on the acquired correction value and the processing characteristic, image processing on an image acquired by joining the partial images, to acquire a processed image wherein gradation of the processed image has been converted.

19. The image processing method according to claim 18, wherein the feature acquiring acquires a plurality of types of feature amounts from at least one of the partial images.

20. The image processing method according to claim 19, further comprising:
    determining, based on the acquired information indicating the anatomical region, which of the types of feature amounts obtained from which of the partial images is used for acquiring the processing characteristic,
    wherein in the acquiring of the gradation conversion processing characteristic, the gradation conversion processing characteristic is acquired based on a determination of the determination unit.

21. A non-transitory computer-readable medium storing a program for a computer to execute the method of claim 18.

* * * * *